(No Model.) 3 Sheets—Sheet 1.
W. L. GREGG.
PROCESS OF MANUFACTURING BRICK.
No. 385,615. Patented July 3, 1888.
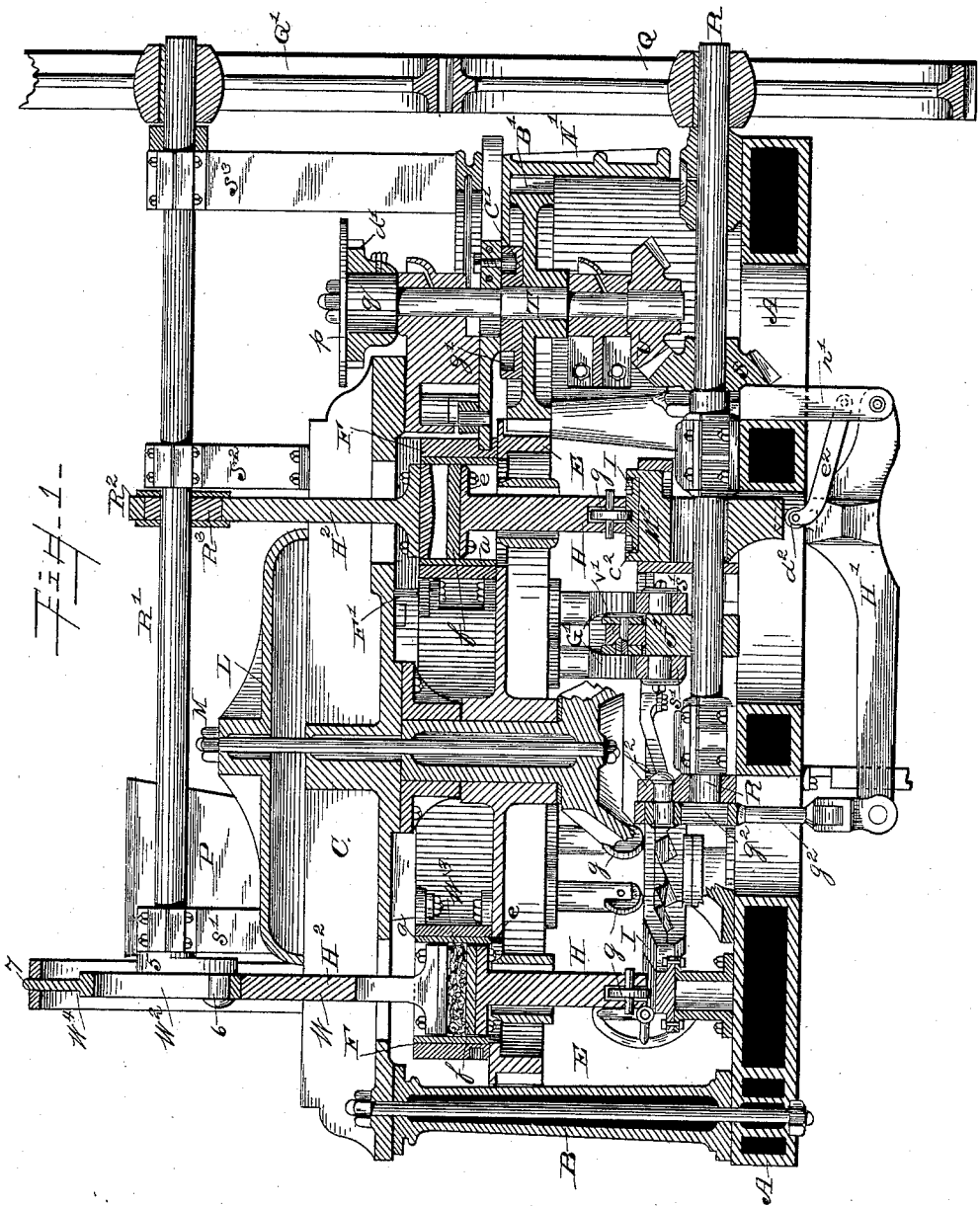
WITNESSES,
Joseph H. Blackwood
INVENTOR,
Wm L. Gregg
by Wm H. Doolittle
Attorney.

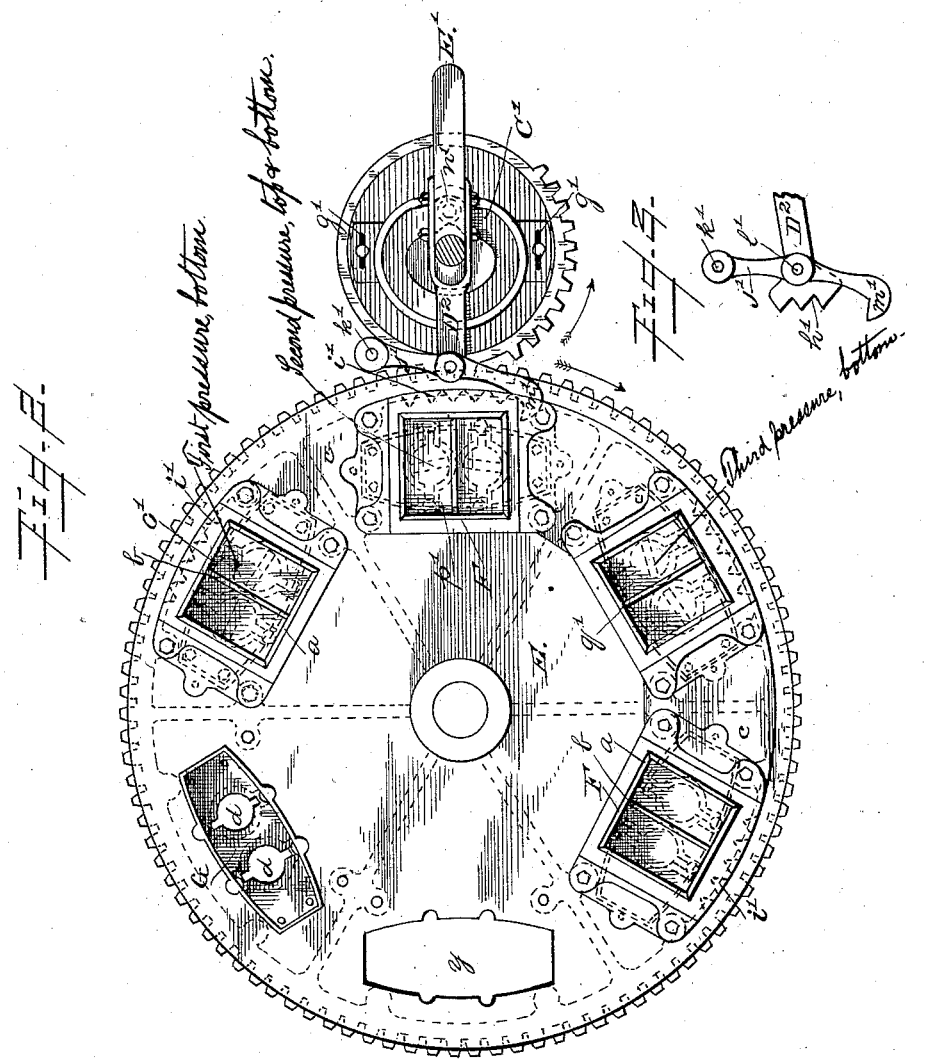

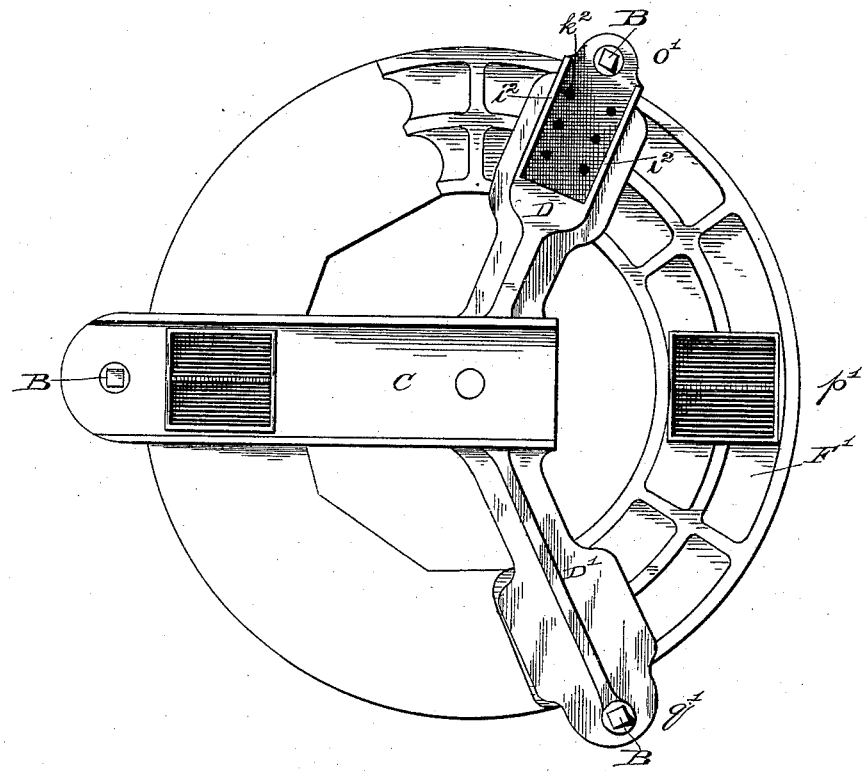

UNITED STATES PATENT OFFICE.

WILLIAM LAMPAS GREGG, OF PHILADELPHIA, PENNSYLVANIA.

PROCESS OF MANUFACTURING BRICK.

SPECIFICATION forming part of Letters Patent No. 385,615, dated July 3, 1888.

Application filed April 9, 1888. Serial No. 270,044. (No model.)

*To all whom it may concern:*

Be it known that I, WILLIAM LAMPAS GREGG, a citizen of the United States, residing at Philadelphia, in the county of Philadelphia and State of Pennsylvania, have invented certain new and useful Improvements in the Manufacture of Brick; and I do hereby declare the following to be a full, clear, and exact description of the invention, such as will enable others skilled in the art to which it appertains to make and use the same.

My invention relates to improvements in the manufacture of brick.

The object of this invention is to produce a complete, homogeneous, and finished brick without the necessity of re-pressing the same.

To this end it consists of the method, as hereinafter described and claimed, for giving to the clay, first, a developing-pressure in the molds, whereby the brick is developed and air and surplus clay removed; second, a simultaneous downward and upward pressure, which gives to the brick a solid, uniform, compact quality and shape, and, finally, a third pressure to further solidify the brick and give it a smooth, hard, finished form and condition.

The disadvantages of a single pressure of a plunger on a mass of clay in a mold in a brick-machine is to leave the brick irregularly impacted and outlined. The disadvantage of successive pressures on one side of the clay in a mold is to leave that side more firmly solidified than the other, there being sufficient molecular resistance in the body of the clay against the impact to prevent the formation of a uniformly-homogeneous brick. The disadvantages of successive pressures, first on one side and then on another, are that successive uneven displacements of the particles take place, preventing the formation of a thoroughly-solidified brick with uniformly-hard sharp edges. With these methods a re-pressing operation is necessary to produce a perfect brick. By my method the first pressure drives out the air and surplus clay and develops the brick and solidifies the mass to a certain extent. The brick now receives a simultaneous up-and-down pressure which at once produces a uniform density and outline. The brick is then given a finishing-pressure, that serves the same purpose as the pressure given in a re-pressing machine, to perfect its surfaces and edges.

My method is preferably performed on that class of machines having an intermittently-rotating mold table with sets of molds in which the clay is subjected to successive pressures by followers traveling on a truck and raised by levers and pressure-blocks, as illustrated in my Patents Nos. 168,564, 299,067, and 352,616. The means for performing my present invention are fully described in my pending application, No. 246,294. So much of these means as is employed to perform this process is illustrated in the accompanying drawings, in which—

Figure 1 is a vertical longitudinal section of the machine; Fig. 2, a top view of the mold table and boxes, two of the boxes being removed; Fig. 3, a detail, being a plan of the lock and latch; Fig. 4, a detail plan view of the pressure-plate over the mold-table.

In the drawings, A represents the bed-plate.

B are three posts rising from the bed-plate.

C is the main truss, one end of which rests upon one of the posts B and is secured by a bolt passing through the post and bed-plate.

D D', Fig. 4, are two branch trusses bolted at one end to the main truss, with their other ends resting upon two of the posts B, and secured thereto by bolts which pass through the posts and bed-plate.

E is a mold-table provided with gear upon the periphery, and also, as shown, with six mold-boxes, F, each of which, as shown, is double. The table is provided with openings over which the mold-boxes are placed, one of which is shown at $y$. The mold-boxes are secured to the mold-table, as indicated in Fig. 2. Each box is provided with a steel lining, $a$, and a partition, $b$.

$c$ represents metal plates which are bolted to the tops of the mold-boxes.

G, Fig. 2, represents guides for the follower-stems, which guides are made independent and are secured to the bottoms of the mold-boxes by means of bolts. These guides are provided with recesses $d$, to permit the insertion from above of the rollers at the lower end of the follower-stems.

H $H^2$ are the followers. As shown, a follower consists of a head, $e$, on the stem of which is secured a movable plate, $f$. The lower end of each follower-stem H is provided with a roller, $g$. I is a track for the rollers $g$.

L is a hood on top of the main truss, held in place by the center bolt, M, the object of the hood being in part to take a portion of the strain from the bolts which connect the branch trusses with the main truss.

P is a hopper pivoted to the machine.

Q is a gear-wheel driven by a pinion. (Not shown.)

R is the main shaft driven by the wheel Q.

S is a miter-wheel on the shaft R.

T is a vertical shaft, on the lower end of which is a miter-wheel, U, engaging with the miter-wheel S.

$p$ is a face-plate on the top of hub $q$, which hub is keyed to the shaft T.

$d'$ is a mutilated pinion secured to the hub $q$.

B' is a mutilated pinion engaging with the mold-table, and being so arranged that one revolution of the pinion B' gives to the mold-table one-sixth of a revolution, as shown in Fig. 2.

C' is a cam which is bolted to this mutilated gear. The plate which carries the cam is provided with slots $g'$, so that the cam can be adjusted on B'.

D'' is a bar forked at its outer end and having upon its inner end, as shown, three teeth, $h'$, which engage with notches $i'$, of which, as shown in Fig. 3, there are five in the side of the mold-boxes.

E' is a bar which is bolted to the fork of D''.

$j'$ is a latch pivoted at $k'$ to the frame and at $l'$ to D'', which latch has a hook, $m'$, at its free end.

$n'$ is a roller supported on a pin which is bolted to E', the roller being arranged in the groove of the cam C', Fig. 2.

F' is a counter-pressure plate against which the brick are pressed from below. This plate extends from a point near the hopper around to the opposite side of the machine as far as required. The parts of this plate which are between those parts which receive the pressure are cut away somewhat, as shown in the drawings, to save metal, and also at its central portion, in order to admit of the action of the intermediate upper pressure-followers.

There are three pressure-levers, G', H', and a third lever, G, the same as G', (not shown,) to operate the lower followers. G' and G are pivoted at their outer ends to the frame. H' is pivoted to a hanger, $r'$, Fig. 1. The lever G' is operated by a cam, J', on the shaft R, which cam has pivoted to it two rollers, $s'$, which are arranged under and come in contact with the inner end of the lever G', and which raise the same as the shaft R rotates. The inner end of the other pressure-lever passes into the forked end of the lever G', and is provided with a roller, $v'$, and this lever is operated by the main body of the cam J', which comes in contact with the roller $v'$, the other lever G' being operated, as before stated, by the same cam J', through the rollers $s'$. (See Fig. 1.)

M' is a pressure-block below the portion of the track $c^2$. It extends down below the shaft R and is provided with a large passage, through which the said shaft R passes. This pressure-block rests at its lower end on a roller, $d''$, in arms $e^2$, pivoted to the hanger $r'$, which roller rests on an upward projection from the lever H'. This lever is operated by means of a crank, $f'''$, secured to the shaft R, and a pitman, $g''$. A similar pressure-block is placed under the lever G'.

H$^2$ is an upper follower for giving a downward pressure against the upward pressure given by the lower middle follower, H. It is keyed onto an upper shaft, R', by means of a strap, R'', and carries an eccentric, R$^3$. The shaft R' has its bearings in standards S' S$^2$ S$^3$, which are bolted to the main truss and to the housing.

Q' is a wheel mounted on shaft R', gearing with driving-wheel Q on the lower main shaft. The gears just mentioned having the same number of teeth, and the bottom followers being driven by shaft R, it follows by this arrangement that a simultaneous top and bottom pressure is given by the top and bottom followers, H H''.

W is a swab for clearing and oiling the molds. It is provided on its upper end with a yoke, W'', and at the lower end is divided into followers extending into the molds and carrying at their ends and sides cleaning material, such as sheep-skin or sponge, W$^3$. The swab is driven by a crank, 5, and crank-pin, 6 working in the yoke W$^2$. The yoke is provided with a stem, 7, guided by an arched standard, W$^4$, bolted firmly to the main truss. When operated, the swab will be pressed into the molds against the head of a follower, so that any particles of clay or dust adhering to the sides of the mold or to the follower-head will be removed thereby, and the molds at the same time oiled.

In my patent, No. 168,564, (one object of which is to make paneled brick,) above referred to, the clay is first subjected to a light pressure in the molds by a press-wheel and the surplus removed by a knife. The second pressure is an upward one, made by a plunger against a pressure-plate, and the third and final pressure is also an upward pressure against a pressure box. At the same time a plunger descends through said pressure-box to recess or panel the brick. In that machine, therefore, the pressures are all upward against a plate or box, except the first pressure of the wheel and the one to form the panel. I have, however, found it a great advantage to give the brick a double simultaneous plunger-pressure, and the disadvantages of successive pressures from one side are set forth at the beginning of the specification.

N' is a housing which stiffens the frame and incloses the mutilated gear and furnishes protection against injury therefrom. This housing is secured to the bed-plate and extends upward therefrom.

$k''$ are tubes secured in the pressure-plate F', and extending up through the truss D, for the passage of surplus clay under the first pressure. This truss is provided with upwardly-extending projections $i''$, which form a partial box to receive the discharged surplus clay. (See Fig. 4.)

The operation is as follows: The mold-table remains at rest a portion of the time, being driven by a mutilated pinion. When at rest, one of the mold-boxes will be beneath the hopper, and then clay will be fed to such mold-box. When the mold-table again starts, the filled mold-box will pass under the counter-pressure plate F', the surplus clay being swept off. The machinery is so timed that when the mold-box reaches the point for the first pressure at $o'$, Fig. 2, the mold-table will stop while pressure is being given. The mold-table will then again move and will be again brought to rest, and this operation will be continuously repeated. The brick receives three pressures—the first pressure at $o'$, the double pressure at $p'$, and the third pressure at $q'$. When the machinery is fairly in operation, the pressure-levers at these three points will be operated simultaneously by the rotation of the shaft R. The first pressure at the point $o'$ is given through the lever G', the operation of which has been before explained; but it may be further stated that by the raising of the lever G' and the pressure-block thereunder (similar to M') the follower-stems which rest upon said pressure-blocks will be raised with their followers, giving the brick the first pressure. The second bottom pressure at the point $p'$ is given through the operation of the lever H', one end of which is raised by the rotation of the shaft through the crank $f''$ and pitman $g''$, the raising of which lever also raises the pressure-block M', and with it carries up the follower-stems, which are supported thereon. At the same time a top pressure is given by the upper plunger, $H^2$, by the operation of the eccentric $R^3$ on the upper shaft, R'. The third pressure is given by a lever like G', which, as before stated, is operated by the rotation of the shaft R through the cam J', acting upon the roller $v'$ at the inner end of the said lever, the raising of which lever raises a pressure-block similar to M'.

The bar D'', with the teeth $h'$ upon the end thereof, serves as a locking device to hold the mold-table at rest while the pressure is being given to the brick. This locking device (shown in Figs. 2 and 3) is operated by the rotation of the mutilated gear-wheel B' and the cam C' and roller $n'$. The latch $j'$ is operated in the same manner and at the same time, being pivoted to B'; but the free end of the latch travels a little faster than its center, so that the hook $m'$ will be brought into position to engage with one of the mold-boxes before the lock has fairly entered the notches $i'$, and this latch will arrest the movement of the mold-table at the proper point, even though its momentum should have a tendency to drive it a little too far.

What I claim is—

1. The process of manufacturing brick, consisting, first, in supplying the clay to the mold; second, giving the clay a single plunger-pressure from one side of the mold, whereby the brick is developed; third, giving the clay a simultaneous double plunger-pressure from both sides of the mold, and, fourth, giving the clay a final single plunger-pressure to complete, solidify, and finish the brick, substantially as described.

2. The mode of manufacturing brick, consisting, first, in supplying the clay to the mold; second, giving the clay an upward pressure, whereby the brick is developed and air and surplus clay expelled; third, giving the clay a simultaneous top and bottom pressure, and, fourth, giving the clay a final upward pressure to complete, solidify, and finish the brick, substantially as described.

In testimony whereof I affix my signature in presence of two witnesses.

WILLIAM LAMPAS GREGG.

Witnesses:
CHARLES B. COXE,
W. F. HAYWARD.